Jan. 2, 1951      C. SKLAREK      2,536,233
ADJUSTABLE LIGHT MOUNTING
Filed April 2, 1946
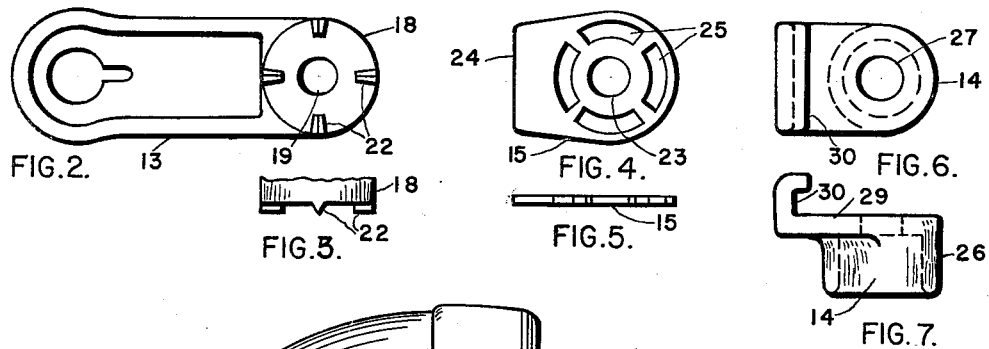
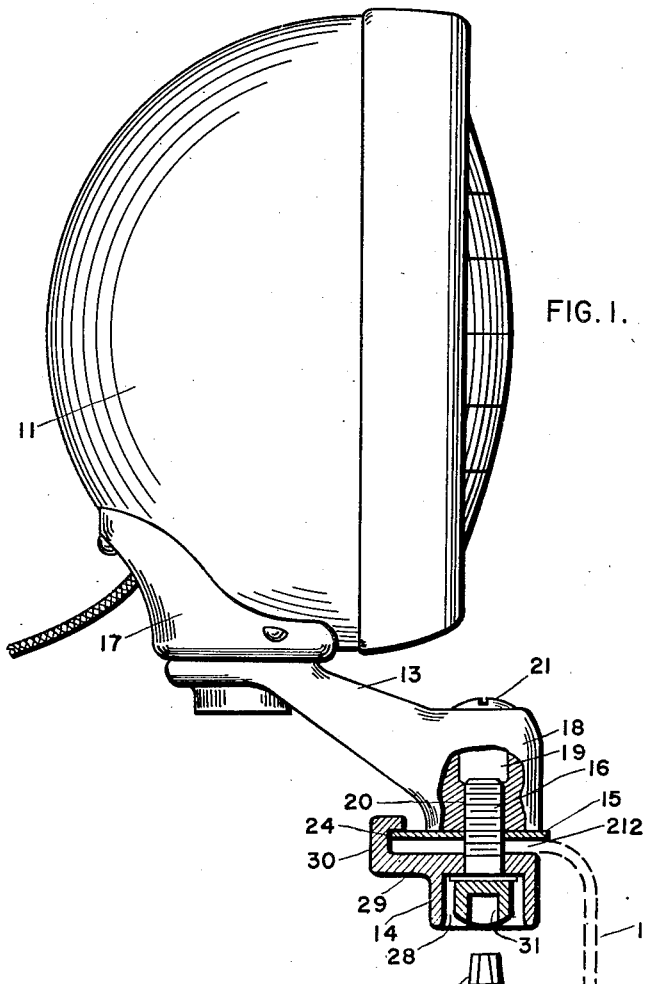
INVENTOR
Clifford Sklarek
PER Joseph Harris
ATTORNEY Patented Jan. 2, 1951

2,536,233

UNITED STATES PATENT OFFICE 2,536,233

ADJUSTABLE LIGHT MOUNTING

Clifford Sklarek, Los Angeles, Calif.

Application April 2, 1946, Serial No. 659,085

2 Claims. (Cl. 248—226)

This invention relates to improvements in adjustable light mountings and more particularly, but not exclusively, mountings or bracket attachments to automotive vehicle bumpers of that type of light commonly called a fog light.

An object of the present invention is to provide an effective and simple means, adjustable to meet the varying conditions encountered in actual practice, for securing lights, such as fog lights, to bumpers or the like of that type having a heavy bar construction with a top horizontal flange.

Another object of the invention is to provide a mounting or attachment for fog lights or the like, which mounting or attachment directly cooperates with the bumper or like support, to prevent or minimize malicious tampering with or theft of the light after being installed.

More specifically, an object of the invention is to provide light attaching means having provision for angular adjustment, which means is especially adapted for attachment to a supporting member having a horizontal flange and wherein the attaching means and flange are so correlated that said means cannot be turned or twisted after the parts have been properly adjusted and assembled.

Other objects of the invention will more clearly appear from the description following, taken in connection with the accompanying drawing and as set forth in the appended claims.

In said drawing, Fig. 1 is a side elevational and part vertical sectional view showing the improved mounting means for a fog light on a bumper, indicated in dotted lines, of general channel shape such as now found on many automotive vehicles. Fig. 2 is a bottom plan and Fig. 3 a partial side elevation of the bracket arm employed in the construction. Fig. 4 is a top plan and Fig. 5 a side elevation of the locking washer employed in the construction. And Figs. 6 and 7 are top plan and side elevations, respectively, of the bumper clamping jaw employed in the construction.

In the drawing, 10 indicates, in dotted lines, a bumper bar of generally channel shape such as now commonly used on automotive vehicles and to which the fog light, indicated at 11, is adapted to be directly secured, said bumper bar having a top horizontal flange 12 extended inwardly toward the usual radiator of the vehicle, as will be understood.

The improved mounting for the light, as shown, comprises a bracket arm 13, a bumper clamping jaw 14, a lock washer or plate 15 and a securing bolt 16.

To provide for universal adjustment of the shell of the light 11 with respect to the bracket arm 13, the latter and saddle 17 riveted to the light shell, will have cooperable spherical bearing surfaces with an associated retaining bolt, deemed unnecessary to be shown or described in detail, other than to state that anti-theft provision with respect to the retaining bolt will be provided similar to that hereinafer described in connection with the bolt 16.

Referring now to the bracket arm 13, the same is formed at its lower end adjacent the bumper bar with a hub-like section 18 vertically apertured at 19, the lower portion of the aperture being threaded at 20 to cooperate with the bolt 16 as shown and the top of the aperture being closed preferably by a screw plug 21 to seal the aperture from the weather. On its bottom face, the hub 18 is provided with a plurality of preferably radially and uniformly-disposed, relatively shallow lugs 22—22 for the purpose hereinafter described.

The locking washer 15, as shown, is in the form of a flat plate rounded at one end concentric with the circular aperture 23 therethrough and provided with a straight edge 24 at its opposite end. Uniformly disposed around the aperture 23 is a plurality of arcuate slots 25 corresponding in number and location to said lugs 22 but of greater arcuate extent than said lugs.

The bumper clamping jaw 14, as shown, is formed with a depending housing section 26 centrally apertured at 27 for passage of the bolt therethrough and with an enlarged, circular recess 28 for housing the bolt head, as best shown in Fig. 1. The jaw 14 is further provided with a horizontal flat section terminating in a straight line, upwardly extended hook-shaped formation 30 adapted to fit over and engage with the inner edge of the bumper flange 12 and straight edge 24 of the lock washer as shown in Fig. 1.

In applying the assembly to the bumper bar, the flange 12 of the latter will first be drilled to provide an opening for the bolt 16, said opening being located the proper distance from the inner edge of said flange to correspond with the location of the bolt apertures in the bracket arm, washer and clamping jaw, as will be understood. The bracket arm 13 and washer 15 are then assembled with the lugs 22 disposed in the slots 25, it being obvious that the bracket arm may thereby be angularly adjusted to the necessary extent in a horizontal plane, relative to the washer, to obtain the proper location and direction of the light to accord with motor vehicle laws. The bracket arm and washer are then applied to the bumper bar and then the clamping jaw 14 hooked over the bumper bar and washer, as shown. The bolt 16 is finally applied, thereby securely locking the bracket arm, washer and jaw 14 against rotation or twisting, inasmuch as the bumper bar itself prevents any such movement.

To further minimize attempts to maliciously tamper with the fog light attachment, the bolt head is made cylindrical and provided with a socket 31, requiring a special tool for turning and, after all the parts have been assembled, a lead plug 32 is driven into the socket so that the bolt cannot then be turned without first either reaming or melting out the plug.

From the preceding description, it will be seen that the improved mounting means consists of relatively few parts each of simple and relatively inexpensive construction; the attachment to the bumper bar can be easily made by the drilling of a single hole in the bumper bar; and the construction is such as to render it difficult of removal by any ordinary method, thus minimizing the danger of theft which is so prevalent with many former types of fog light mountings.

Although there has herein been shown and described what is now considered the preferred embodiment of the invention, the same is merely illustrative and all changes and modifications are contemplated that come within the scope of the appended claims.

What is claimed is:

1. A light mounting of the character described adapted to be applied to a bumper bar of the type having an upper horizontal flange having a bolt aperture therethrough and an adjacent bearing edge, said mounting comprising a bracket arm, a lock washer, a bolt, and a clamping jaw, said arm and washer having cooperable interlocking formations and adapted to be applied to the top side of the bumper bar flange with the washer between the arm and flange, said clamping jaw adapted to be applied to the under side of the bumper bar flange and having means adapted to engage said bearing edge of the bumper bar flange to prevent rotation of the clamping jaw relative to the bumper bar and also to engage said washer to prevent relative rotation between the washer and bracket arm, said bracket arm having a threaded aperture to cooperate with the bolt and the washer and clamping jaw having apertures alignable with the bumper bar flange aperture for passage of the bolt shank therethrough to the bracket arm for attaching and locking the mounting to the bumper bar said means on the clamping jaw comprising a hook-shaped section engageable over said bearing edge of the bumper bar flange and adjacent edge of the washer.

2. A light mounting adapted to be applied to an apertured horizontal flange of a bumper bar having a bearing edge, said mounting comprising a bracket arm, an apertured washer, a securing bolt and a clamping jaw, said arm and washer having cooperable formations preventing relative rotation when assembled in operative condition on the upper side of said flange, said jaw being adapted to be applied to the under side of said flange, and cooperable means, on the washer and jaw members of the mounting preventing relative rotation between said flange and washer and jaw members when the mounting is assembled and clamped on the flange, said means comprising a section on one of said members extending over and engageable with both the adjacent edge of the other said member and said bearing edge of the flange.

CLIFFORD SKLAREK.

REFERENCES CITED

The following references are of record in the file of this patent:

UNITED STATES PATENTS

| Number | Name | Date |
|---|---|---|
| 2,202,472 | Tornblom | May 28, 1940 |